United States Patent
Baya

[11] 3,911,609
[45] Oct. 14, 1975

[54] INSTRUMENT FOR REMOTE FISHING
[76] Inventor: Jose Pena Baya, Masnou St. 9, Barcelona, Spain
[22] Filed: Feb. 26, 1973
[21] Appl. No.: 335,888

[30] Foreign Application Priority Data
Feb. 28, 1972  Spain .................................. 400666

[52] U.S. Cl. ................................................. 43/26.1
[51] Int. Cl. ............................................ A01k 93/00
[58] Field of Search .......... 43/26.1, 26.2, 43.11, 19; 46/93

[56] References Cited
UNITED STATES PATENTS

| | | | |
|---|---|---|---|
| 2,726,471 | 12/1955 | Uus .............................. | 43/26.1 X |
| 2,951,307 | 9/1960 | Joy ............................... | 43/43.11 X |
| 3,106,796 | 10/1963 | Friedland ..................... | 43/26.1 |
| 3,599,370 | 8/1971 | Armata et al. ............... | 43/26.1 |
| 3,710,500 | 1/1973 | Pena ............................. | 43/26.1 X |

*Primary Examiner*—Warner H. Camp
*Attorney, Agent, or Firm*—Bacon & Thomas

[57] ABSTRACT

A self propelled fishing float is provided with a timer designed to effect immediate and positive deactivation of the motor of the fishing float upon timer-controlled release of fishing hooks and sinkers. A special propeller is provided to decrease propeller drag during recovery of the float stern-first, and motor air inlet and exhaust conduits are provided in association with a water tight motor compartment cover.

9 Claims, 16 Drawing Figures

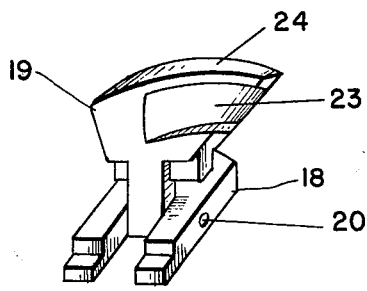
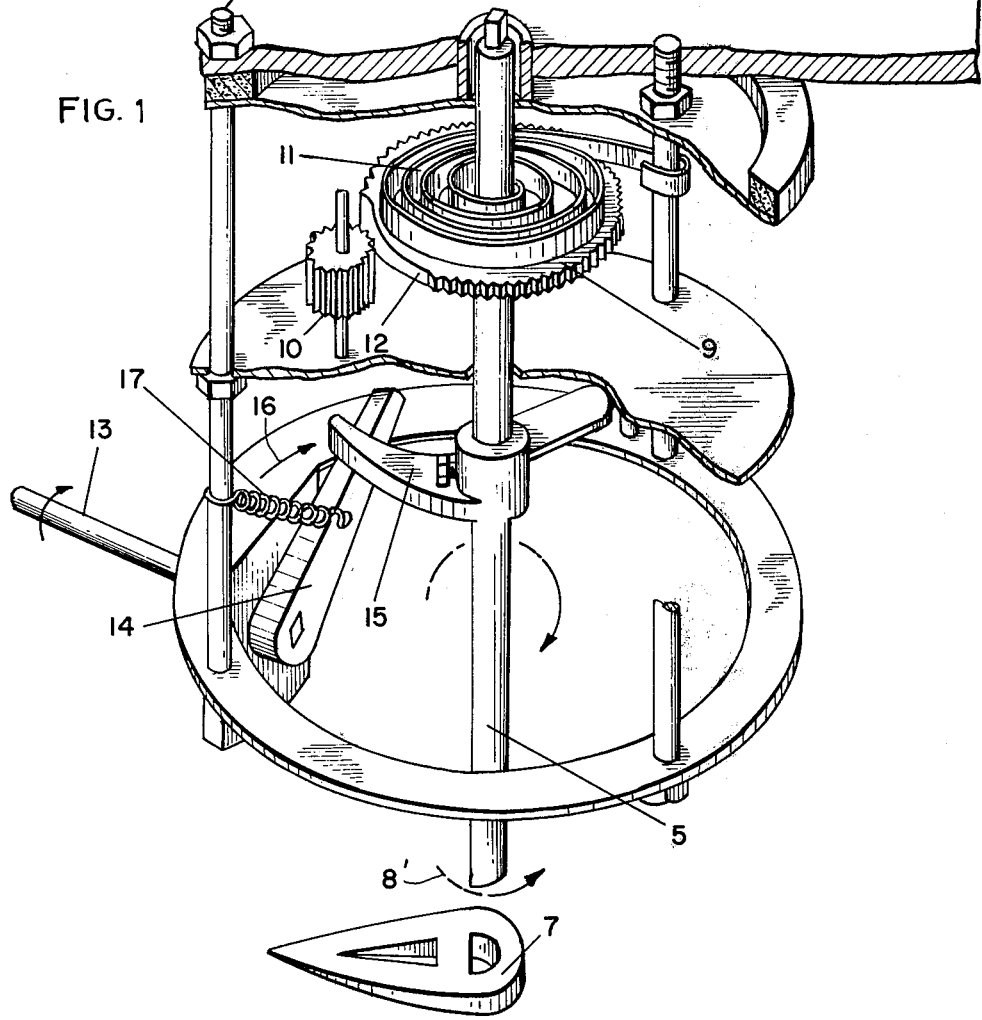

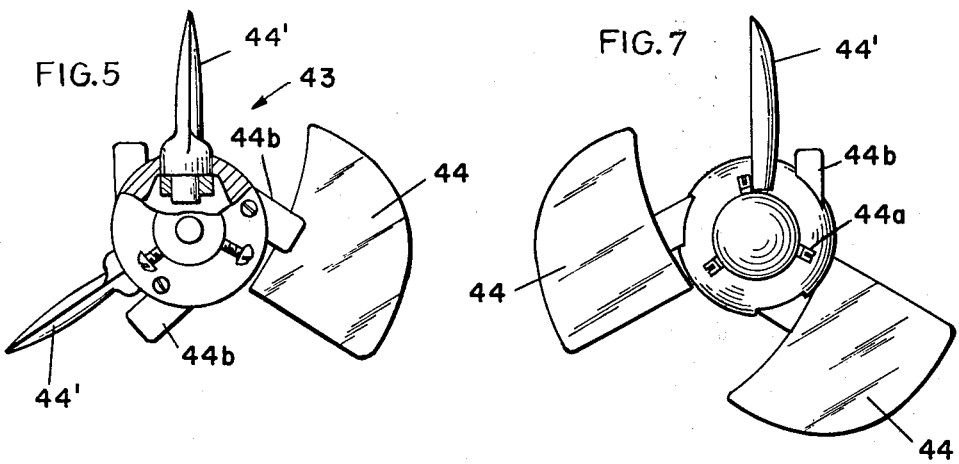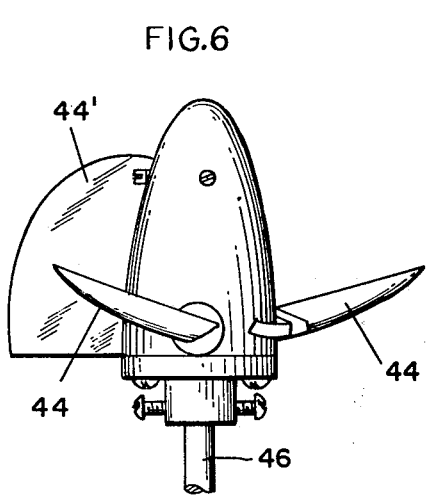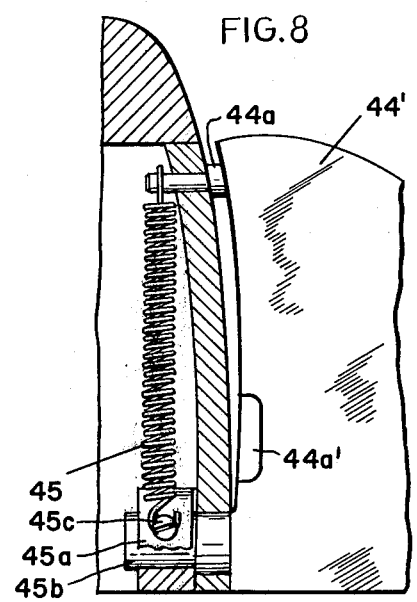

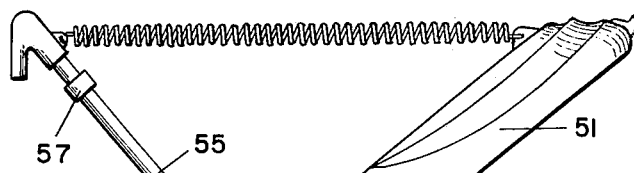
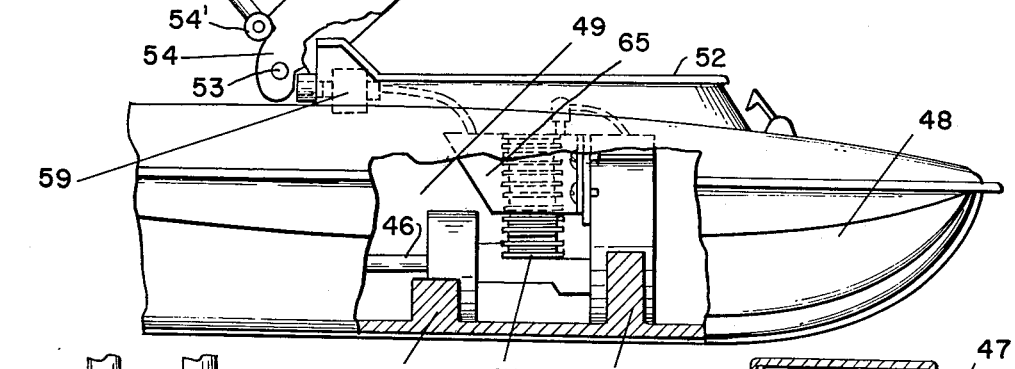
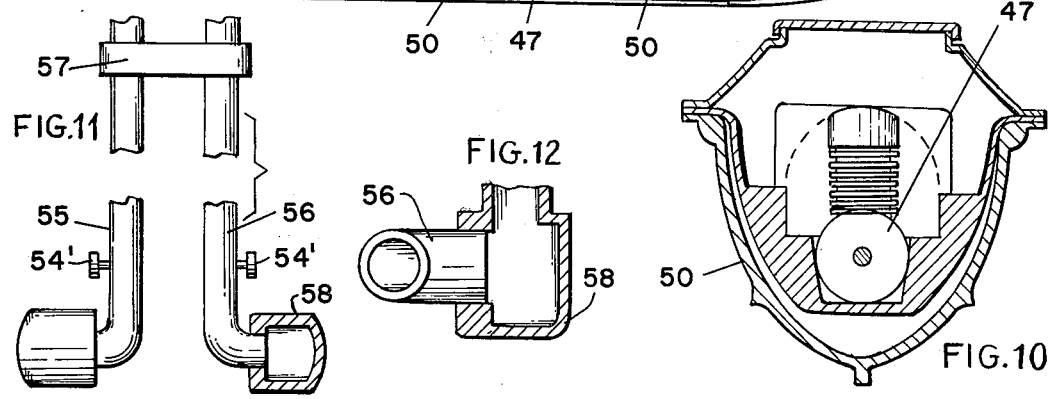
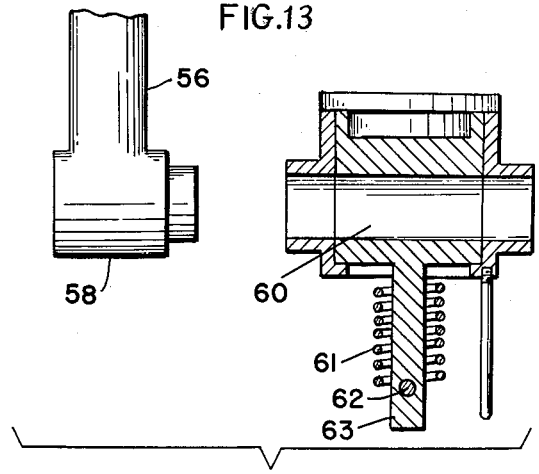
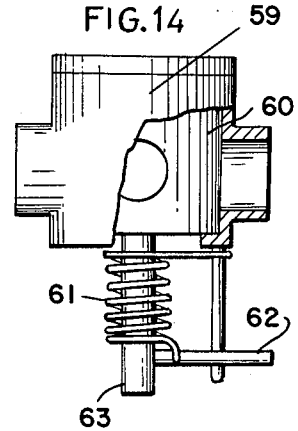

INSTRUMENT FOR REMOTE FISHING

BACKGROUND OF THE INVENTION

This invention relates to a self propelled fishing float of the type shown and described in U.S. Pat. No. 3,710,500 issued to the present applicant. The instant invention is an improvement in the timer release for the sinkers and hooks and which also enables positive, immediate deactivation of the driving motor for the float, as well as other improvements as set forth below.

The present invention obviates certain difficulties encountered with the basic system disclosed in the earlier patent, particularly in the motor control system, the propeller drag problem when the float is to be recovered, and the provision of operating and cooling air to an air cooled engine in a water tight compartment in the hull of the float.

SUMMARY OF THE INVENTION

The present invention modifies a spring wound and drag gearing timer which is generally known per se by undercutting a portion of the primary timer gear to eliminate the teeth therefrom, whereby the timer shaft may be impulse driven by the timer spring at the moment when the motor shut off control is to be activated by the timer. The motor is thus shut off by a positive, impulse type of force at a precise moment corresponding to the release of the hooks and secured lines from their float attached casings.

The present invention also provides a propeller for the fishing float, the propeller having resilient means for urging the propeller blades to a 90° pitch setting whereby they may be aligned with the longitudinal axis of the float when the motor stops.

Thus, the released lines and hooks do not become entangled in a still rotating propeller and recovery of the float over a long distance is facilitated by the 90° pitch setting of the propeller blades.

The invention also provides a means for providing cooling air to the motor and a unique cover arrangement for the water tight compartment that is interrelated with engine air inlet and exhaust outlet conduits. Cooling air for the motor is provided through the engine operating air inlet and is circulated over the engine by utilizing an exhaust ejector to discharge the cooling air with the exhaust stream.

BRIEF DESCRIPTION OF THE DRAWINGS

FIG. 1 shows the improved timer control of the present invention and its connection to the motor control linkage and the interconnecting cam for controlling release of the hooks from their respective casings:

FIG. 2 shows a view of the release actuating cam in a rotated position;

FIGS. 5-8 show the variable pitch propeller used in this arrangement and the means for urging the blades thereof to a 90° pitch setting at rest;

FIG. 9 shows the float of this invention with air and exhaust conduits arranged in an improved manner;

FIG. 10 shows the engine in its compartment;

FIGS. 11-14 show various details of the engine inlet and exhaust conduit system, including valve elements for the conduits;

DESCRIPTION OF THE PREFERRED EMBODIMENTS

Figure 3:
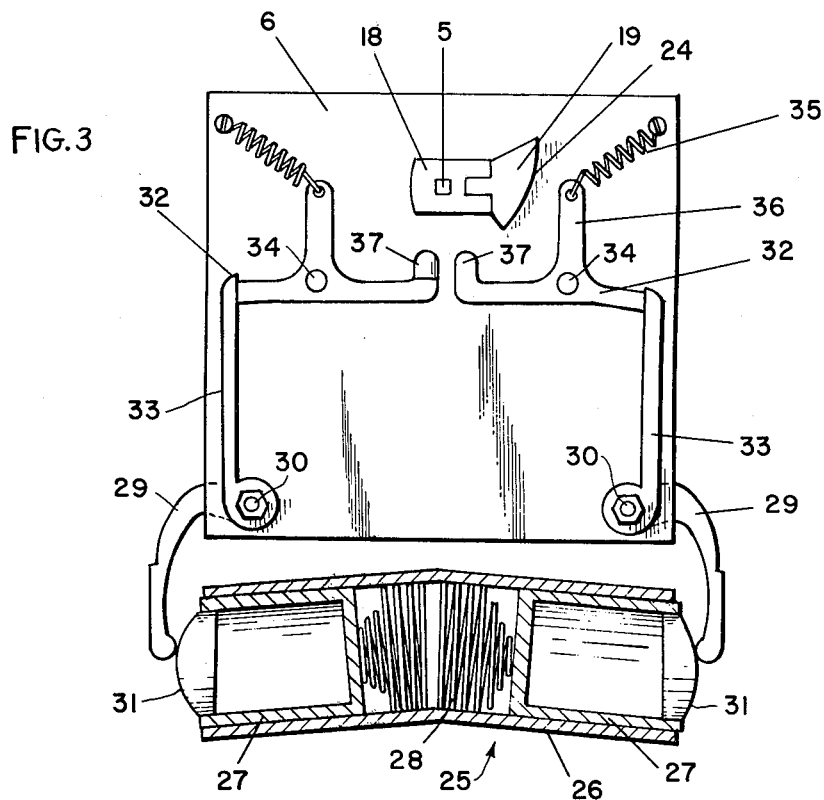
FIG. 3 shows the hook and sinker casings with their associated release control means.

The fishing float of this invention is generally shown in U.S. Pat. No. 3,710,500, previously issued to the present applicant. The timer arrangement shown in that patent has been improved upon in the manner illustrated in FIG. 1 attached hereto.

The timer mechanism is generally conventional and includes a winding and motion output shaft 5 in housing 6 having a winding indicator knob 7 at one end and a release actuating cam assembly 8 rigidly secured to its other end.

The timer includes a primary gear 9 engagable normally with the remaining gearing of the timer, of which only pinion gear 10 is illustrated, pinion 10 being the last gear in the timing gear chain between the timer gearing and the primary gear 9. The shaft 5 is connected to a windable coil spring 11 in a conventional manner.

The gear 9 is provided with an undercut section 12 where the teeth are eliminated over a portion of the periphery of gear 9.

A motor control linkage including a shaft 13 and crank arm 14 is pivotally attached to the timer housing assembly as illustrated. A motor control pawl 15 is attached to shaft 5 so as to engage arm 14 to move same towards a motor shut off position (direction of arrow 16) when the timer spring has moved shaft 5 to its release position, as will be described below. A spring 17 urges the motor control arm 14 to a motor run position to enable starting of the motor.

Thus, shaft 5 of the timer is normally rotated in the direction of arrow 81 to wind spring 11 and to start the operation of the timer. The unwinding spring force is controlled by the timer in a known manner through timer gearing including primary gear 9 and pinion 10 to provide output motion that is time regulated. The relative orientation of cam 8, and pawl 15 with respect to each other and shaft 5, and the undercut section 12 is such that at the moment cam 8 releases the hooks and sinkers in the manner to be described below, the gear 9 presents the undercut section 12 to pinion 10, thereby freeing gear 9 and shaft 5 from the restraint of the timer gearing, causing spring 11 to drive the shaft in an impulse manner until the spring is unwound or until the undercut 12 passes the pinion 10 completely. At this time, the impulse motion of shaft 5 is directly transmitted to the pawl 15 to shut off motor operation through the motor control linkage arm 14 and shaft 13. The undercut section 12 enables limited free rotation of shaft 5 so that spring 17 may pull arm 14 back to the motor run position once the shaft 5 has rotated so as to present undercut section 12 to pinion gear 10.

The cam assembly 8 includes a first planar body 18 secured directly to shaft 5, the section 18 extending transversely of the shaft and being rotatable therewith. A second planar cam section 19 extends co-planar with section 18 and is pivotally secured thereto by transverse pin 20 extending through extension 21 of cam section 19 and body section 18. The pin 20 can be seen to extend transversely of an imaginary radial line extending from shaft 5 in the plane of rotation of members 18 and 19. A laminated spring 22 biases element 19 toward the co-planar relationship between members 18 and 19, but permits resiliently restrained upward pivotal movement of member 19 about pin 20. The undersurface of member 19 is sloped at 23 (FIG. 2) for reasons that will become clear below. The outer surface 24 of member 19 is curved to provide a cam actuating surface that engages the release means for the hooks and attached lines.

With reference to FIG. 3, the casings carrying the hooks and sinkers, and even bait if desired, are generally shown at 25, include an outer shell or casing 26 and inner cannisters or the like 27 which contain the hooks, sinkers and lengths of attached leads and lines (not shown) used for remote fishing. Coil springs 28 constantly urge cannisters 27 towards a released position overboard of the float, but release arms 29 pivoted at 30 hold covers 31 or other retaining means for cannisters 27 in place by means of trigger levers 32 that engage portions 33 of arms 29.

Levers 32 each include a pivot joint at 34, spring biasing means 35 secured to section 36 tending to hold triggers in the cocked or armed position shown in FIG. 3, and the cam follower sections 37 engageable with cam surface 24 of cam 19 when the timer rotates the latter into engagement with the followers 37.

Figure 4:
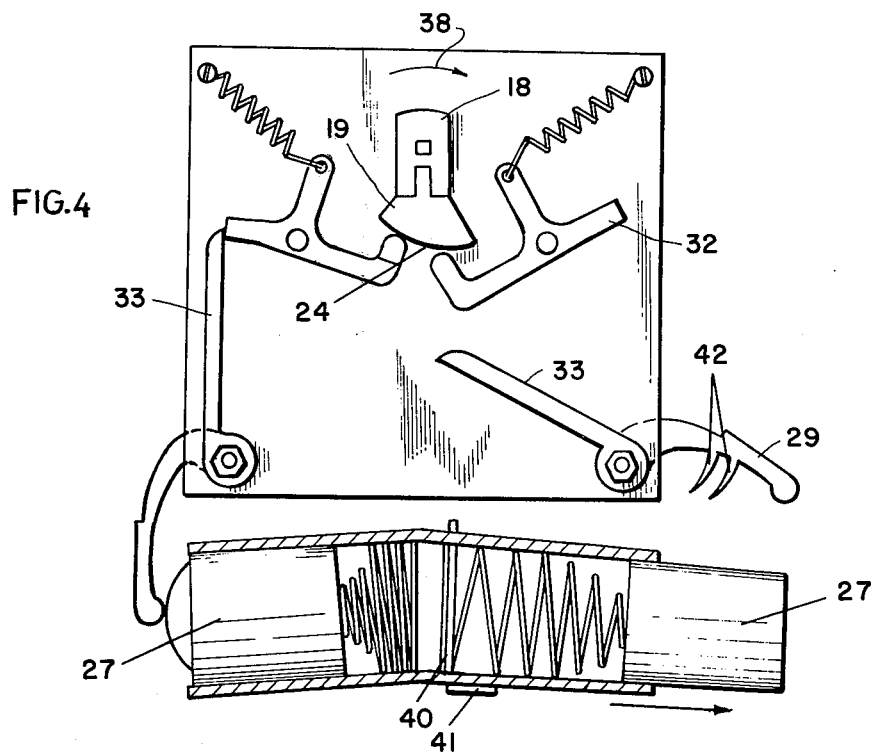
FIG. 4 shows the sequential release of the casings.

FIG. 4 shows cam 19 driving trigger levers 32 to a release position where springs 28 in casings 26 can drive the cannisters 27 overboard. It will be observed that rotation of cam 19 in a direction of arrow 38 causes sequential release of triggers 32 and release of casings 25 so that the lines released from the cannisters do not entangle. Also, the sloped undersurface of cam 19 enables the latter to ride up over followers 37 when the shaft 5 is wound in a direction opposite to arrow 38 for initiating operation of the timer.

The casing 25 is provided with removable inner end wall sections 40 which can be removed by grasping ends 41. Yokes 42 may be provided to support two arms (not shown) connected to the float which support fishing lines used when the cannisters contain bait only without lines.

The propeller arrangement of the present invention is shown in FIGS. 5–8. Blade assembly 43 includes blades 44 and 44' which are respectively shown in their relatively flat pitch working setting and their 90° pitch at rest setting. Blades 44' in FIGS. 5 and 8 are shown drawn to their 90° pitch setting by spring 45 (each blade has a similar internal structure as shown in FIG. 8) against blade stop 44a. Element 44a in FIG. 8 is a crank arm bushing secured to blade support shaft 45b which enables spring 45 to be secured to the shaft 45b by fastener 45c at a radial location with respect to the longitudinal axis of the shaft, whereby the spring force exerts a constant torque or moment on shaft 45b in a pitch increasing direction (clockwise about shaft 45b looking towards the left in FIG. 8). The stop 44 a, of course, limits blade travel beyond 90° as shown in FIG. 8. When the drive shaft 46 is driven at operating speed, centrifugal twisting moments acting on blades 44, 44' tend to urge the blades towards a flat pitch position with substantial force due to the eccentric mounting of the blades on their support shafts. A discussion of centrifugal twisting moments such as referred to above may be found in any text on propeller theory, or, for example, reference may be made to U.S. Pat. No. 3,469,633 for a description of the general theory.

When the blade assembly 43 is rotating at operational speed, blades 44, 44' are driven to the position shown by blades 44 in FIGS. 5–7 against their flat pitch stops 44b. Recesses 44a' shown in FIG. 8 engage the stops 44b and prevent complete flattening of the blades and consequent running away of the engine by way of overspeeding. The recesses 44a' tend to rigidify and secure the blade against the flat pitch stops 44b, as shown in FIG. 5.

In operation, revolution of drive shaft 46 at operating speed causes blades 44, 44' to assume their propulsive position as shown by blades 44, with the force of spring 45 and the force of water over the blades being overcome by the centrifugal twisting moments acting on each blade. The end of spring 45 secured to bushing 45a coils over the bushing 45a as the shaft 45b of blade 44' in FIG. 8 turns counterclockwise looking toward the left in FIG. 8, and spring 45 becomes extended by such blade motion. Upon the engine ceasing to drive shaft 46, the turning speed of the propeller quickly diminishes, with the spring 45 then rapidly returning the blades to their 90° pitch setting. This enables the float to be towed stern first during retrieval from shore or by another boat, with minimum drag to the motion of the float being offered by the propeller assembly. The rapid return of the blades to their 90° pitch setting also helps to quickly stop the spinning of the propeller assembly which reduces the chances of the fishing lines which have just been released from being caught up in the blades.

With reference to FIGS. 9–14 of the drawings, the motor location and various motor accessories will be described in connection with the improved fishing float of this invention.

An air cooled motor 47 for the float 48 is located in water tight compartment 49, supported by a yoke assembly 50 as best seen in FIG. 10. The compartment 49 has a cover 51 pivotally secured to an edge of opening 52 to compartment 49 at a hinge pin 53. Cover 51 is provided with a cam surface 54 adjacent hinge pin 53 as shown in FIG. 9.

A pair of variable length (e.g. telescopic) tubes or conduits 55, 56 are provided for motor inlet air for combustion air, for cooling the engine and for motor exhaust gases (the exhaust conduit 56 is behind the air inlet conduit 55 in FIG. 9, see FIG. 11). The conduits are tied together by member 57 adjacent their distal ends and are pivotally secured at their lower ends in FIG. 9 to the float through pivot connections 58 adjacent cam 54 and hinge pin 53 of cover 51. A cam follower arrangement 54' associated with conduits 55, engages cam 54 and causes the conduits 55, 56 to be lowered whenever cover 51 is lowered. A spring or other resilient connection is provided between distal ends of conduits 55, 56 and cover 51 for causing the conduits 55, 56 to raise to the position shown in FIG. 9 when cover 51 is raised to start the motor. The cover 51 is lowered after the motor is started to enclose the motor in a water tight compartment and in this mode of operation, the conduits 55, 56 are in substantially a horizontal position.

Figure 15:
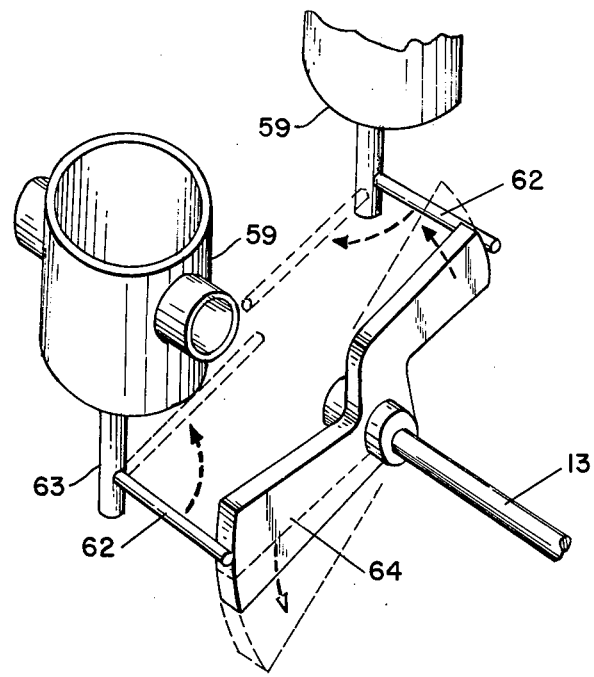
FIG. 15 shows the motor control linkage including the inlet and exhaust duct shut off means.

As shown in FIGS. 13, 14, and 15, each conduit 55, 56 is connected to a closable valve element 59 in its flow path. In FIGS. 13 and 14, the valve 59 is shown as comprising a rotatable valve element 60 normally resiliently biased by spring 61 towards a normally closed position (FIG. 14) to prevent inadvertent admission of water to the engine during the handling of the float. Lever arm 62 on valve stem 63 is engageable by motor control linkage shaft 13 (FIG. 15 and 1) with motor valve control cams 64 thereon. Cams 64 are rotated to the motor run position as shown in FIG. 15 and valve elements 60 are held opened as shown. Actuation of the lever 14 in FIG. 1 by pawl 15 on the timer shaft drives the shaft 13 in a direct, sudden manner to cause immediate closing of valves 59 through springs 61 and stopping of motor 47.

Figure 16:
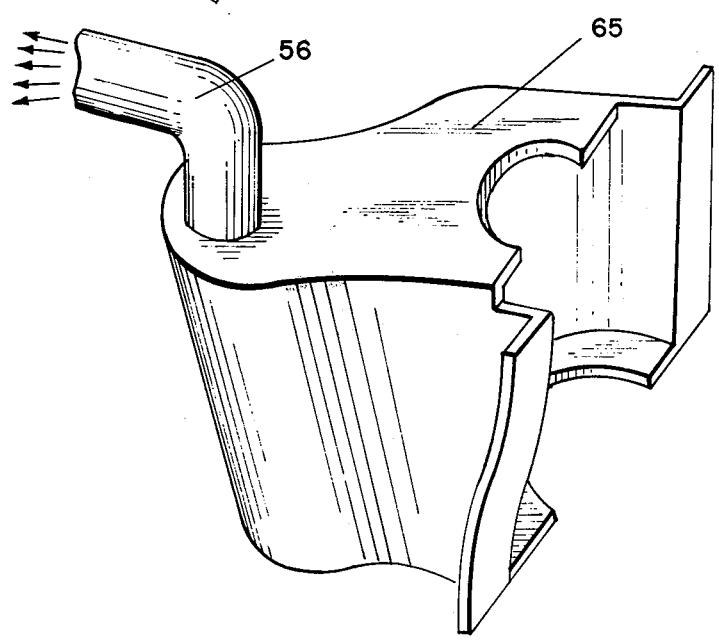
FIG. 16 shows the motor exhaust injector system for circulating cooling air over the motor.

In FIG. 16, a cooling air shroud 65 is illustrated for the motor 47. Cooling air to the motor is received from a branch (not shown) of inlet air conduit 55 and is circulated about motor 47 and thence collected by shroud 65 and aspirated by exhaust conduit 56 which has a suitable inlet opening therein (not shown) for accomplishing the cooling air circulating and exhausting function.

The self propelled fishing float incorporating the present invention operates generally as follows. Engine compartment cover 51 is raised, the engine is started and brought up to r.p.m. by a throttle mechanism after the cover is closed and just at the time of release of the float from shore or from another boat. The throttle and exhaust conduit valves 59 are in the open position, of course, and held there by cams 64. The timer mechanism, previously set for a desired engine running time after the float has been released, enables the engine to run until the predetermined time period has elapsed, whereupon, as discussed above, the primary gear 9 disengages pinion 10 to cause sudden rotation of the timer shaft in an impulse manner. At this moment, the cam assembly 8 is driven swiftly to cause opening of cannisters 25 to release the fish lines, sinkers and bait, if desired, overboard, and simultaneously the motor control arm 14 along with shaft 13 is rotated to close throttle and exhaust valves 59 to shut the engine down. The blades 44, 44' are rapidly slowed and stopped altogether from rotating as their pitch returns to the 90° setting, and the float coasts gently to a free floating or drifting position. Usually, a tether line has been carried by the float from shore or another boat, this line then being used to pull the float and the fishing lines back to the point of release of the float, along with whatever catch has been made on the fish hooks.

I claim:

1. In a self propelled fishing float including a hull, outwardly opening casing means carried by said hull, said casing means releasably containing a sinker and hook attached to a fishing line, release means for releasing said sinker and hook from said casing, a motor having a control linkage, an adjustable, wound spring and gearing type timer carried by said hull, and means interconnecting said sinker, hook releasing means and said timer to cause release of said sinker and hook after a predetermined time interval, the improvement comprising:

A. a winding and output motion shaft on said timer;
    B. an actuating cam for said release means, said actuating cam being mounted on said shaft and engageable with said release means upon unwinding of the spring of said timer and rotation of the timer gearing after a predetermined time interval;
    C. said timer including a first gear attached to said shaft, said first gear having an undercut section wherein no teeth are provided, said first gear engaging other timer gearing which effectively brakes free rotation of said first gear in a manner known per se except when said undercut portion of said first gear is presented to said other gearing, at which time said first gear and shaft are free to rotate within a prescribed limited arc;
    D. windable spring means connected to said shaft in said timer and means for winding said spring to initiate a controlled, spring driven rotation of said shaft, said shaft being free to rotate under the impulse of said spring free of said other timer gearing when said undercut section of said first gear is presented to said other timer gearing;
    E. a motor control pawl connected to said shaft and rotatable therewith, and engageable with said motor control linkage to activate said linkage to a motor shut off position, the angular orientation of said pawl with respect to said shaft, said first gear and said release means actuating cam being such that the motor is shut off during free rotation of said shaft under the impulse of said spring substantially immediately when said release means is actuated, whereby said motor control linkage is driven to the shut off position by a rapid impulse stroke when said sinker and hook are released.

2. The self propelled fishing float recited in claim 1, further including spring biasing means for automatically returning said motor control linkage to a motor run position after it has been driven to the shut off position for enabling subsequent restarting of the motor.

3. The fishing float recited in claim 2, further including a motor driven propeller for said float, said propeller having spring-biased blades normally urged towards a 90° pitch setting at rest, but centrifugally drivable to a thrust producing pitch range when the propeller is motor driven, whereby the float may be hauled stern first in water with the motor stopped with minimum propeller resistance to the motion.

4. The self propelled fishing float as recited in claim 2, further wherein said motor is disposed in a water tight compartment in said hull, said compartment having a pivotable cover secured to the top edge of said compartment at a pivot hinge, said cover having a cam surface adjacent its pivot hinge; and further including variable length motor air inlet and exhaust conduits pivotally secured to said hull adjacent said cover pivot hinge, and resilient means interconnecting the distal ends of said conduits and said cover intermediate said pivot hinge and the opposite edge of said cover, said conduits haveing cam follower surfaces engaged by said cover cam surface, whereby pivoting said cover to an open position causes said conduits to be pivoted to a raised position through said resilient means and lowering of said cover causes said conduits to be lowered to a generally horizontal position through said cover and cam follower surfaces.

5. The self propelled fishing float recited in claim 1, further wherein said casing means comprises a double-ended receptacle, each end containing a sinker and hook attached to separate lines, said casing release means including a pair of release arms, one for each container end for retaining said sinkers and hooks in said receptacle ends, and a pair of triggers levers extending between said release arms and said timer interconnecting means, said trigger lever arranged to be actuated sequentially by said interconnecting means when said timer releases said sinkers and hooks to prevent tangling of said lines upon release of said sinkers and hooks.

6. The self propelled fishing float as recited in claim 5, further including line holders associated with each of said pair of release arms for said container ends for holding the fishing lines attached to said sinkers and hooks.

7. The self propelled fishing float recited in claim 5, further wherein said interconnecting means between said timer and said trigger levers includes an actuating cam comprising a first planar body portion secured directly to, and extending transversely of a motion output shaft of said timer for rotation in a plane of rotation normal to said shaft, and a second, generally planar cam section extending co-planar with said body portion and pivotable with respect thereto about an axis lying on said plane of rotation and extending transversely of a radial line extending from the axis of said shaft, said cam section including a sloped under-surface, and a spring biasing means for urging said cam section in co-planar relationship with said body portion, but enabling upward movement of said cam section, said sloped under-surface arranged to ride over said trigger levers when said timer is wound, said cam section actuating said trigger levers after said predetermined time when said timer unwinds.

8. In a self propelled fishing float including a hull, a water tight compartment in said hull, a propelling motor within said compartment, means for timing the operation of said motor to shut same off after a predetermined time interval, and release means for a line-attaching fishing hook and sinker, said release means being also controlled by said timer for releasing the hook and sinker after a predetermined time interval; the improvement comprising:

A. a pivotable cover secured to a top edge of said compartment at a pivot hinge, said cover having a cam surface adjacent its pivot hinge;

B. motor air inlet and exhaust conduits pivotally secured at one end to said hull adjacent said cover pivot hinge;

C. resilient means interconnecting the distal ends of said conduits and said cover intermediate said pivot hinge and the opposite edge of said cover;

D. said conduits including means engaged by said cover cam surface, whereby pivoting of said cover to an open position causes said conduits to be pivoted to a raised position through said resilient means, and lowering of said cover causes said conduits to be lowered to a generally horizontal position through said cover cam surface.

9. In a self propelled fishing float including a hull, a motor driven propeller for driving said hull through water, means for timing the operation of said motor to shut same off after a predetermined time interval, and a fishing hook and sinker release means also controlled by said timer for releasing said hooks after a predetermined time interval coinciding with the motor operation time interval, the improvement comprising:

said propeller having spring biased blades normally urged towards a 90° pitch setting at rest, but centrifugally drivable to a thrust producing pitch range when the propeller is motor driven, whereby the propeller stops rotation upon said release of the fishing hook and further whereby the float may be hauled stern first in water with the motor stopped with minimum propeller resistance to the sternwise motion.

\* \* \* \* \*